United States Patent [19]

Murugan

[11] Patent Number: 5,068,557
[45] Date of Patent: Nov. 26, 1991

[54] GENERATOR WITH BEARING-RETAINING STATOR

[75] Inventor: Muthu K. Murugan, Howell, N.J.

[73] Assignee: Allied-Signal Inc., Morris Township, Morris County, N.J.

[21] Appl. No.: 603,964

[22] Filed: Oct. 24, 1990

[51] Int. Cl.⁵ .............................................. H02K 5/16
[52] U.S. Cl. ......................................... 310/90; 310/89
[58] Field of Search ............... 310/40 MM, 89, 90, 91, 310/154

[56] References Cited

U.S. PATENT DOCUMENTS

| | | | |
|---|---|---|---|
| 3,978,357 | 8/1976 | Voelbel et al. | 310/168 |
| 4,611,139 | 9/1986 | Godkin et al. | 310/90 |
| 4,853,567 | 8/1989 | Muramatsu et al. | 310/90 |

Primary Examiner—Steven L. Stephan
Assistant Examiner—D. L. Rebsch
Attorney, Agent, or Firm—Donald B. Paschburg; Howard G. Massung; Robert A. Walsh

[57] ABSTRACT

A generator having a bearing retaining stator includes a housing, a shaft, a rotor, a stator and a bearing. The rotor is connected to the shaft and the stator is inductively coupled to the rotor. The bearing supports the shaft in the housing and is retained in place by the housing and the stator.

3 Claims, 2 Drawing Sheets

GENERATOR WITH BEARING-RETAINING STATOR

BACKGROUND OF THE INVENTION

This invention relates to generators. More specifically, it relates to bearings and stators in the generator.

In the design of generators, particularly for military and aerospace applications, important goals include minimizing weight and size. A particularly advantageous way to attain these goals is to utilize a component to perform dual functions.

SUMMARY OF THE INVENTION

A generator in accordance with the present invention includes a housing, a shaft, a rotor connected to the shaft, a stator inductively coupled to the rotor and a bearing for supporting the shaft for rotation which is retained in place on a first side by the housing and on a second side by the stator.

DESCRIPTION OF A PREFERRED EMBODIMENT

Figure 1:
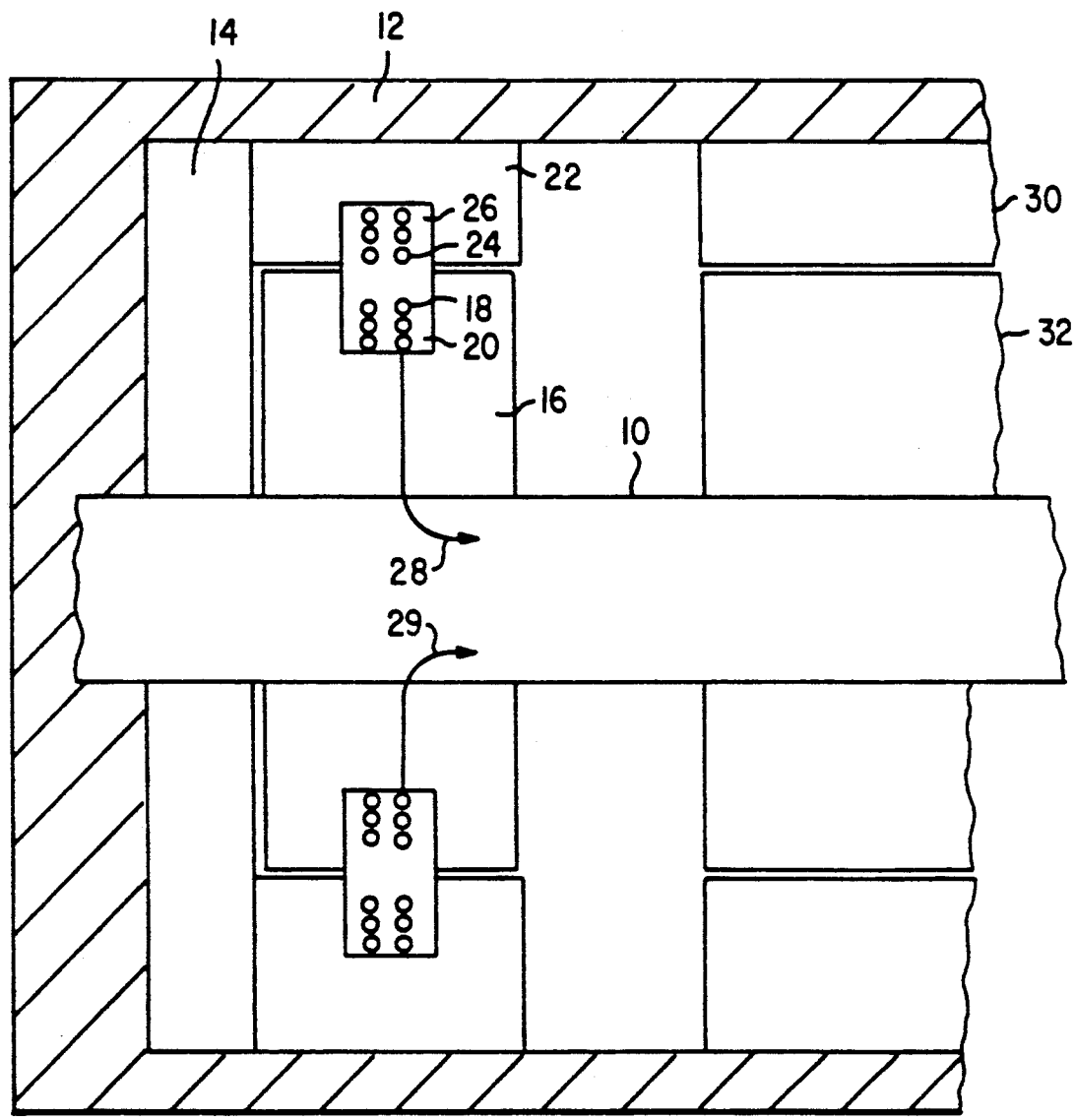
FIG. 1 illustrates a plan view of a generator having a bearing retaining stator.

FIG. 1 ilustrates a generator having a bearing retaining stator in accordance with a preferred embodiment of the present invention. A shaft 10 is rotatably secured at one end of a housing 12 by a bearing 14. The shaft 10 can be secured at the other end of the housing 12 by another bearing (not shown) in a manner similar to that illustrated in FIG. 1, or by any other manner.

A rotor 16 is secured to the shaft 10 for rotation therewith. The rotor 16 includes a plurality of windings 18 which are located in a section 20 which is cut out along the periphery of the rotor 16.

A stator 22 is secured to the housing 12 in a stationary fashion. The stator 22 has a plurality of windings 24 which are located in a section 26 which is cut out inside the periphery of the stator 22.

The bearing 14 is retained in place by the housing 12 at one side and by the stator 22 on the opposite side. The stator 22 extends towards the shaft 10 a sufficient distance to effectively retain the bearing 14 and prevent excessive bearing movement. It is further preferred that a space be provided between the bearing 14 and the rotor 16 to prevent frictional losses.

The rotor 16 and the stator 22 are positioned so that the respective plurality of windings 18 and 24 are inductively coupled. In a preferred embodiment, the plurality of windings 24 in the stator 22 are excited by an oscillator so that voltage is induced in the plurality of windings 18 in the rotor 16. The induced voltage is communicated down the shaft 10 by the wires 28 and 29 to a main rotor 30 which is inductively coupled to a main stator 32.

Figure 2:
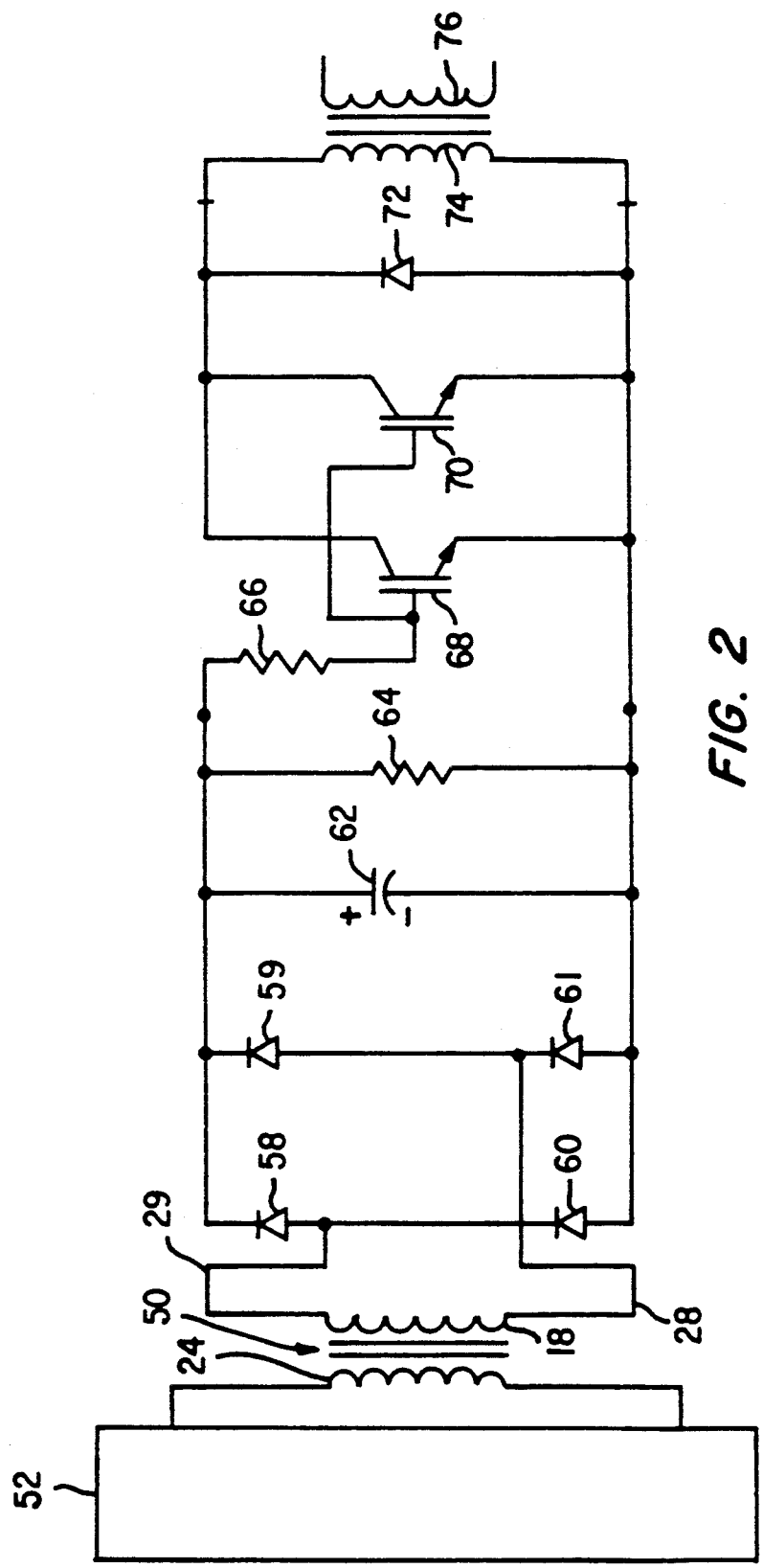
FIG. 2 illustrates a schematic diagram of a rotor shorting circuit in a generator which uses the bearing retaining stator of FIG. 1.

FIG. 2 illustrates a schematic circuit of a rotor shorting circuit which utilizes the bearing retaining stator of the present invention. A transformer 50 having primary windings 24 and secondary windings 18 is driven by an oscillator 52. The primary windings 24 are housed in the stationary stator 22 as illustrated in FIG. 1. The secondary windings 18 are housed in the rotating rotor 16 as illustrated in FIG. 1. In a preferred embodiment the output of the oscillator 52 is a 5kHz signal, although depending on the materials used, a range of frequencies is possible.

The 5kHz signal from the oscillator 52 drives the primary windings 24 and is coupled onto the secondary windings 18. The secondary windings 18 are connected to a standard rectifier bridge which includes diodes 58 to 61. The 5kHz signal is, therefore, rectified. The rectified signal is filtered by a capacitor 62 and a resistor 64. The rectified and filtered signal is passed through a resistor 66 to the gates of two Insulated Gate Bipolar Transistors (IGBTs) 68 and 70. Any switching device can be used in place of the IGBTs 68 and 70.

The collector and emitter gates of each of the IGBTs 68 and 70 are connected in parallel along with a diode 72 and the main rotor field 74 which is located in the main rotor 30. The main rotor field 74 is inductively coupled to a main stator field 76 which is located in the main stator 32. In this application, to start the generator as a motor, an AC voltage is applied to the stator field 76 and an AC voltage is induced in the rotor field 74. The IGBTs 68 and 70 are enabled by the oscillator 52 through the transformer 50 when the generator is to be started so that AC current flows through the IGBTs 68 and 70. When the current direction reverses, the IGBTs 68 and 70 are disabled so that current then flows through the diode 72. Only one IGBT 68 could be used if it has sufficient capacity. Alternatively, additional IGBTs can be used if additional capacity is needed.

I claim:
1. A generator, comprising:
    a generator housing;
    a shaft;
    a rotor connected to said shaft;
    a stator inductively coupled to said rotor; and,
    a bearing adjacent to said shaft for supporting said shaft for rotation which is retained in place on a first side by said generator housing and on a second side by said stator, wherein said rotor and said bearing are adjacent to each other but spaced apart from each other.
2. The generator as claimed in claim 1, wherein said stator is positioned to prevent play in said bearing.
3. The generator as claimed in claim 1, wherein said stator is held in place by said generator housing.

* * * * *